United States Patent [19]

Pender

[11] 4,146,202
[45] Mar. 27, 1979

[54] AIRCRAFT SUCTION SYSTEM FOR LAMINAR FLOW CONTROL

[76] Inventor: David R. Pender, 1018 Marion St., Columbia, S.C. 29201

[21] Appl. No.: 799,170

[22] Filed: May 23, 1977

Related U.S. Application Data

[62] Division of Ser. No. 735,130, Oct. 26, 1976.

[51] Int. Cl.² .................................... B64C 21/06
[52] U.S. Cl. ................................................ 244/209
[58] Field of Search ............... 244/204, 207, 208, 209, 244/212, 217, 215, 216, 53 B; 60/226 R, 226 A, 224, 262; 137/15.1, 15.2

[56] References Cited

U.S. PATENT DOCUMENTS

| | | | |
|---|---|---|---|
| 1,946,921 | 2/1934 | Stalker | 244/209 |
| 2,477,637 | 8/1949 | Mercier | 244/209 |
| 2,508,288 | 5/1950 | Owner et al. | 244/209 |
| 2,511,504 | 6/1950 | Hawkins | 244/212 |
| 2,751,168 | 6/1956 | Stalker | 244/209 |
| 2,843,341 | 7/1958 | Dannenberg et al. | 244/209 |
| 2,876,966 | 3/1959 | Cook | 244/209 |
| 3,097,817 | 7/1963 | Towzey | 244/209 |
| 3,128,973 | 4/1964 | Dannenberg | 244/209 |
| 3,203,648 | 8/1965 | Vanesian | 244/209 |
| 3,974,987 | 8/1976 | Shorr | 244/212 |

Primary Examiner—Galen L. Barefoot
Attorney, Agent, or Firm—B. P. Fishburne, Jr.

[57] ABSTRACT

A porous aircraft skin for wetted areas of an aircraft employed in conjunction with a suction system of the aircraft to draw air inwardly through pores of said skin for laminar flow control. The porous skin is compliant and includes a thin outer skin with fine pores bonded to a lower substantially thicker coarser pore compliant skin with the thicker skin in turn bonded to the structural skin of the aircraft. Vacuum chambers beneath the aircraft structural skin receive air sucked through the porous compliant skin and through communicating holes of the structural skin. One-way valves of flexible or semi-flexible material are inserted into the suction holes of the aircraft structural skin prior to the placement of the porous compliant skin. Low pressure above the aircraft lifting surfaces automatically closes the one-way valves thereby maintaining low pressure above the lifting surfaces and preventing reverse flow from destroying the lift afforded by said surfaces.

6 Claims, 21 Drawing Figures

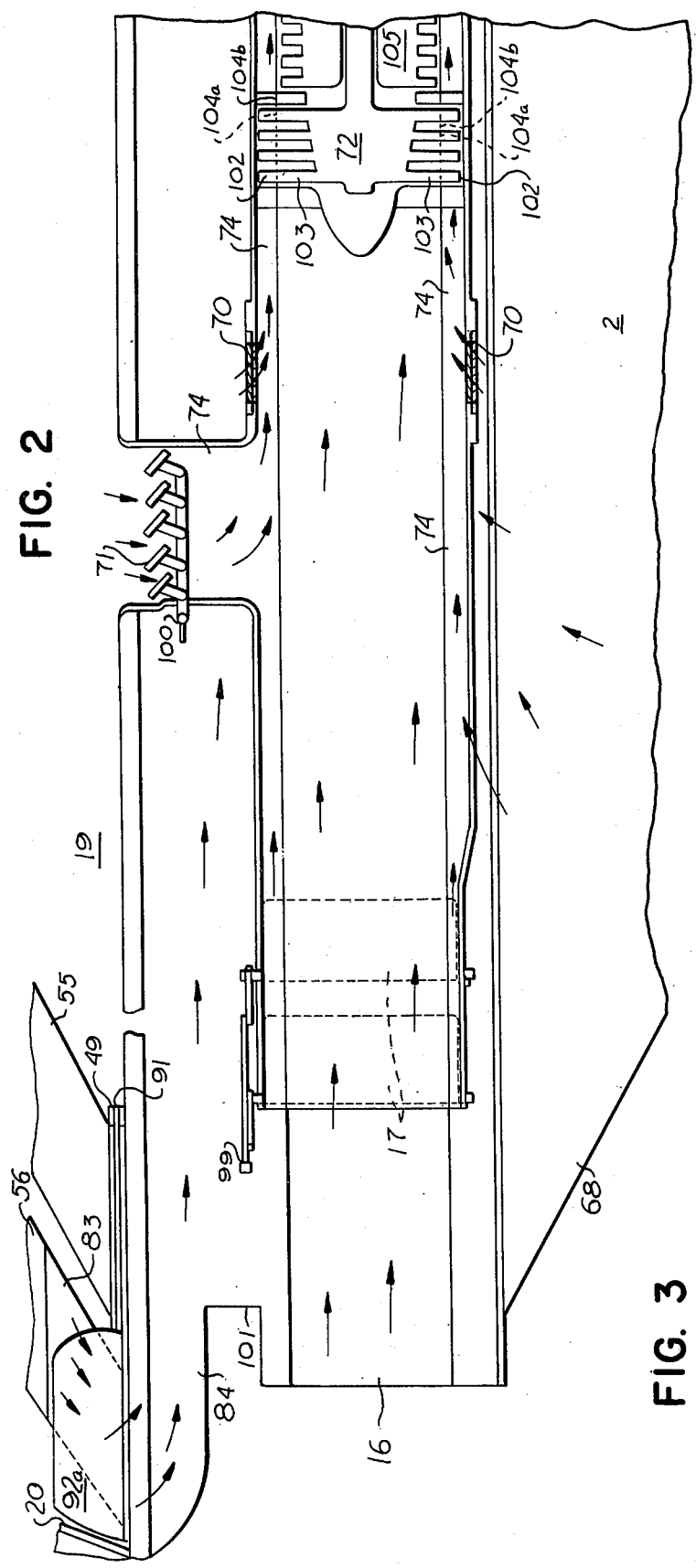
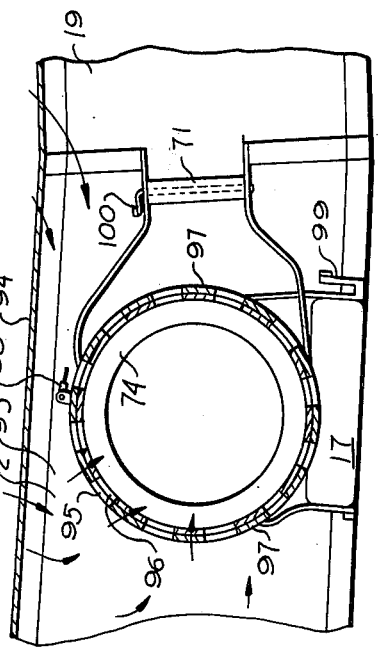

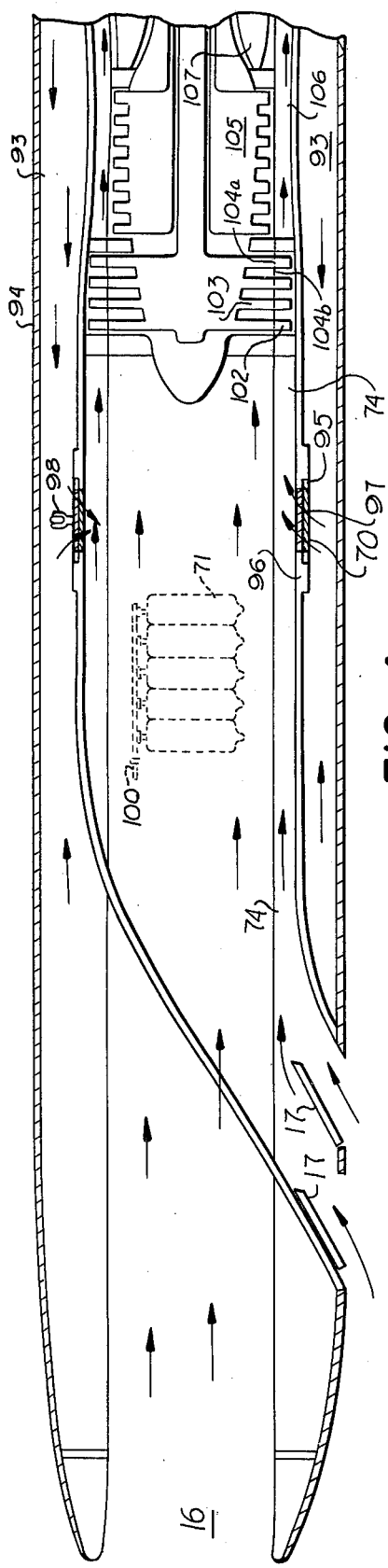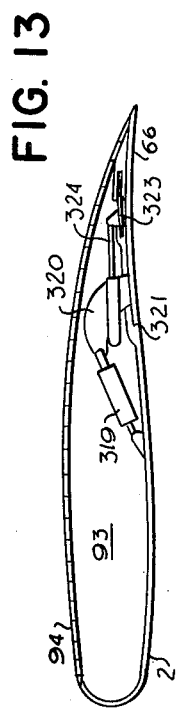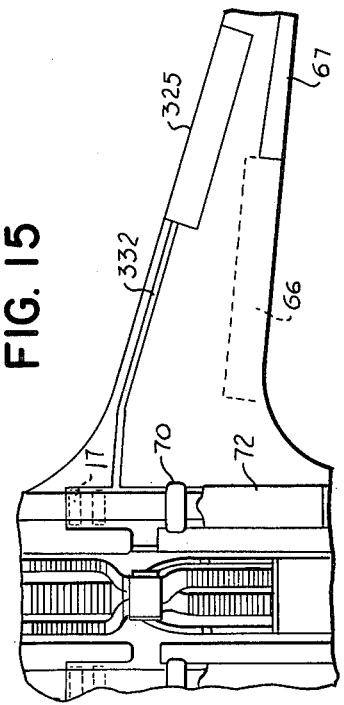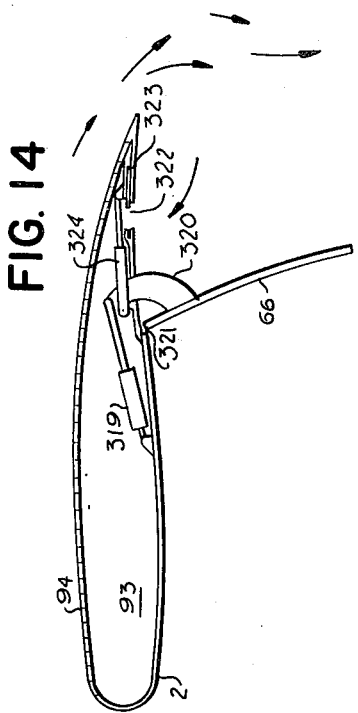

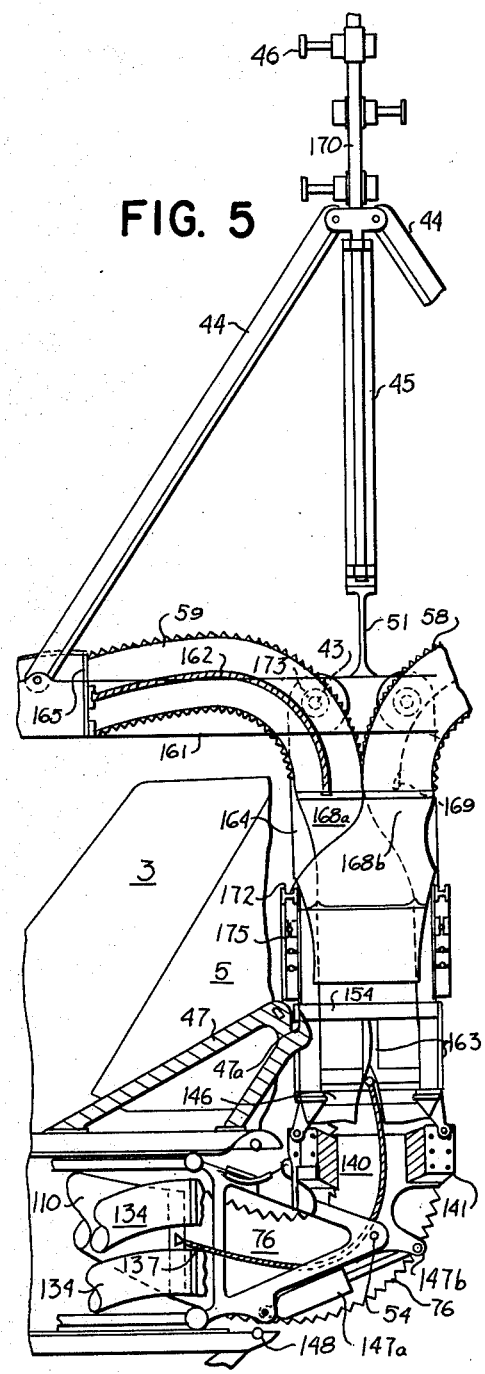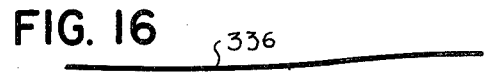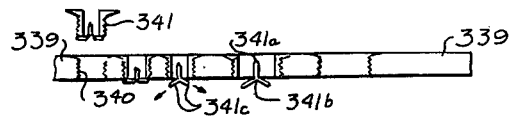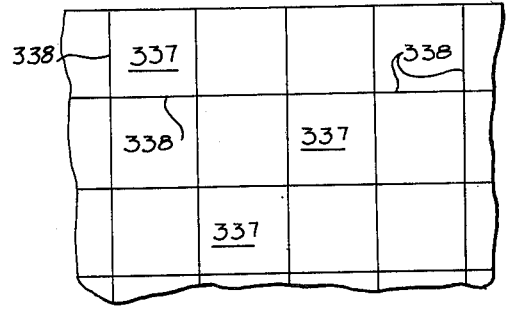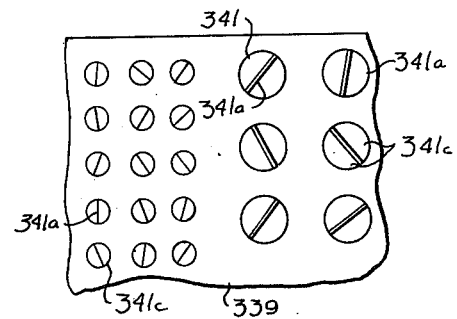

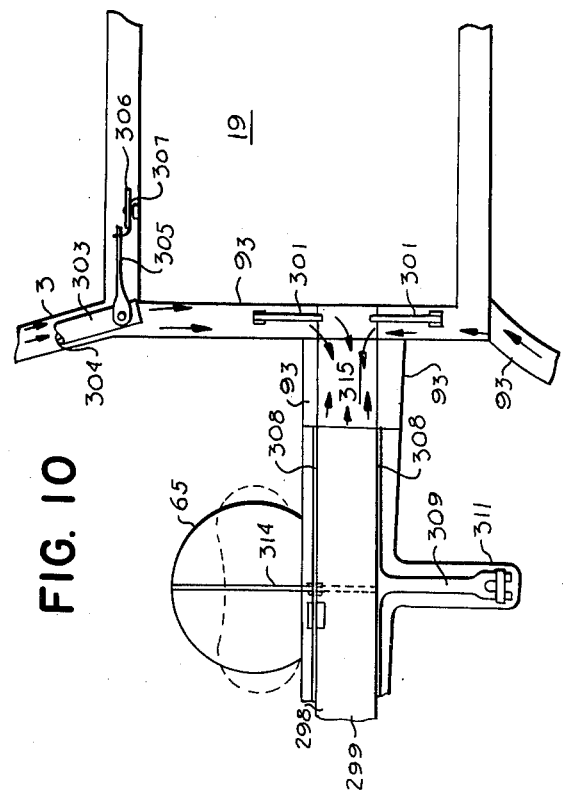
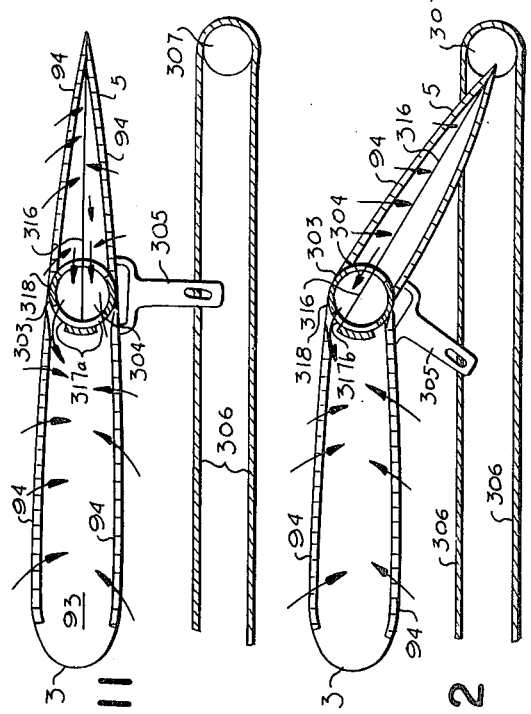
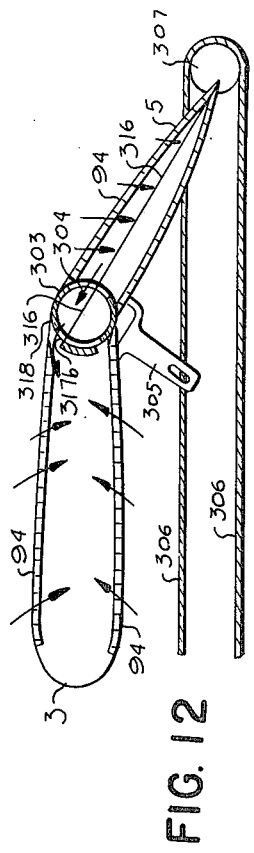
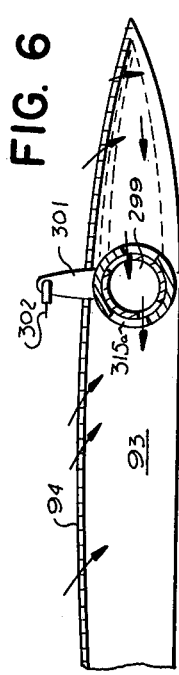
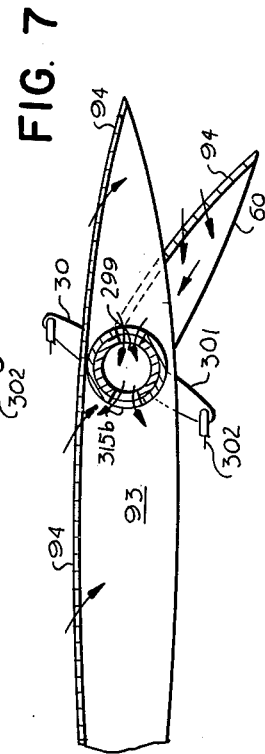
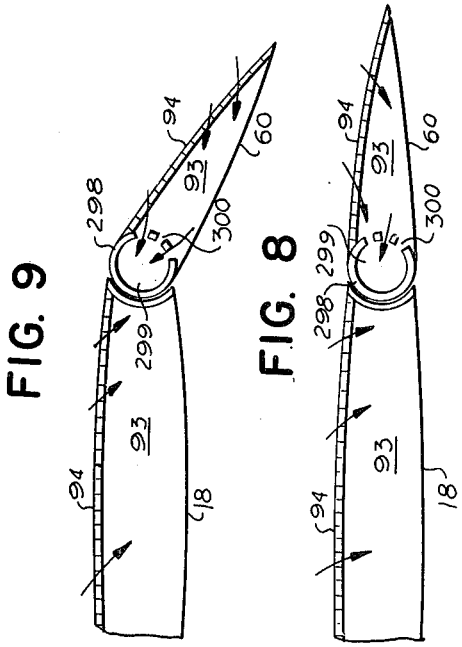

AIRCRAFT SUCTION SYSTEM FOR LAMINAR FLOW CONTROL

This is a division, of application Ser. No. 735,130, filed Oct. 26, 1976.

BACKGROUND OF THE INVENTION

This invention relates to improvements in aircraft, and more particularly to improvements in vertical take-off and landing (VTOL) aircraft of the tail-lifter type such as shown in prior U.S. Pat. Nos. 3,582,021 and 3,762,667, David R. Pender.

Among the objects of this invention are to provide a novel suction system integrated with a low by-pass engine, and adapted to the configuration of a tail-lifter aircraft and further integrated with the rotor flight system of the craft to provide a fuel efficient suction laminar flow control during fixed wing flight.

Another object of the invention is to provide an improved suction surface skin for the wetted areas of the aircraft used in conjunction with the above suction laminar flow control system.

Other objects and advantages of the invention will become apparent during the course of the following detailed description.

BRIEF DESCRIPTION OF DRAWING FIGURES

FIG. 2 is a fragmentary plan view of the forward end portion of one aircraft engine and engine intake components and showing the by-pass fan used as the suction pump for the surface suction system.

FIG. 3 is a fragmentary vertical cross sectional view of the structure in FIG. 2 showing a rotary valve in open position to create an internal wing vacuum chamber for sucking air through a porous skin of the wing.

FIG. 4 is a fragmentary side elevation, partly in section, of the structure in FIG. 2.

FIG. 5 is a fragmentary partly cross sectional view showing the lower portion of the aircraft rotor mast adjacent the rear of the mast stowage tube.

FIG. 6 and FIGS. 7 through 9 are fragmentary vertical sections taken through suction augmented fixed wing elevators.

FIG. 10 is a fragmentary rear end partly diagrammatic view of the horizontal stabilizer showing the thrust deflector with jet tail pipe, the crank arms of the elevator, and the pivot axis of one of the rudders together with part of the rotor stowage tube with suction passages.

FIGS. 11 and 12 are fragmentary horizontal sections of suction augmented rudders.

FIG. 13 and FIG. 14 are cross sectional views through the main wing showing suction assisted split mechanical flaps.

FIG. 15 is a fragmentary plan view of the aircraft on a reduced scale showing the location of components in FIGS. 13 and 14.

FIG. 16 is a fragmentary sectional view of a thin exterior compliant porous skin for wetted areas.

FIG. 17 is a similar view of an underlying thicker compliant porous skin.

FIG. 18 is an elevational view of a one-way check valve.

FIG. 19 is a similar view showing a section of the aircraft structural skin with one-way check valves.

FIG. 20 is a fragmentary plan view of a gridwork shown in cross section in FIG. 17.

FIG. 21 is a fragmentary plan view of the structure in FIG. 19.

DETAILED DESCRIPTION

The Suction Split Flaps

Figure 1:
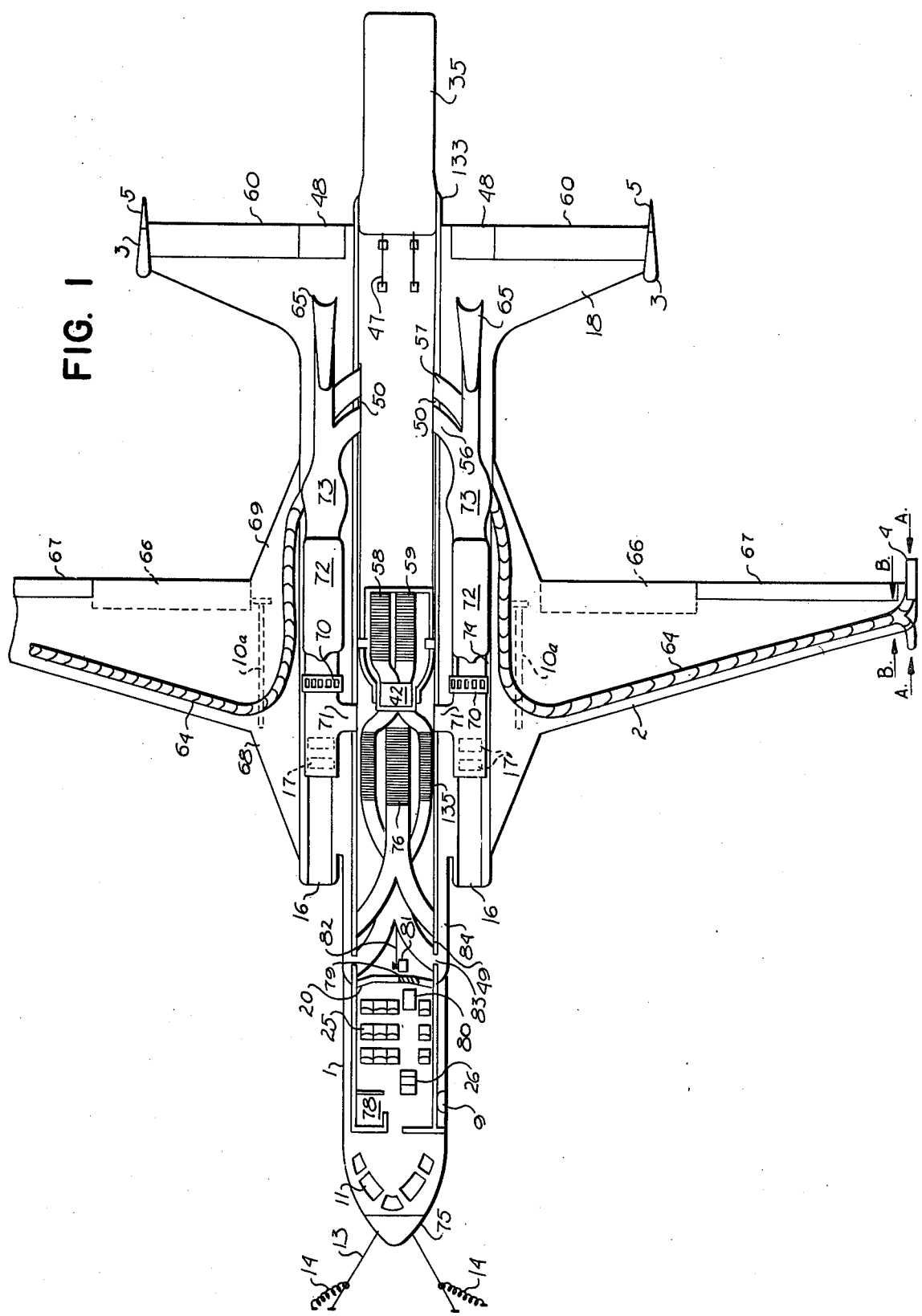
FIG. 1 is a plan view of an aircraft embodying the invention on a partly diagrammatic and partly cut-away basis to reveal key components.

A fixed-wing flap system will enable conversion from fixed-wing flight to rotor flight to take place at a lower air speed. This in turn will: (a) reduce aircraft drop distance before full deployment of the rotor; (b) reduce stress on aircraft components during conversion; and (c) minimize discomfort to passengers. The fixed-wing flap system should also increase safety during conversion, and also increase safety during fixed-wing flight emergency, wheel-less or skid landings.

The suction split flaps 66 are illustrated in FIGS. 15, 13 and 14. This special flap system was devised to take advantage of the suction chamber already placed in the wing for the suction skin laminar flow control system. By using the wing suction for the flaps a high lift flap system can be devised that is mechanically very simple. Without the suction, a far more complex and heavier mechanical flap system would be required to provide equivalent coefficients of lift (such as the triple slotted Fowler flap).

This suction split flap system is based on the same principle as the more complex suction flap system used for the alternate rotor directional control as illustrated. With reference to FIGS. 13 and 14, as the split flap 66 is opened by actuator 319, the variable suction intake slot 322 is uncovered, and the sliding seal 323 opens progressively wider as the flap is opened wider and, therefore, letting in progressively larger amounts of sucked air for greater lift. The sliding seal 323 is controlled by the variable suction intake seal control arm 324, which is attached to the split flap actuator arm 320. This arm 320 is circular in shape and pivots around the split flap actuator hinge 321 so that there is a continuous seal between the actuator arm 320 and the underside of the wing so that air cannot be sucked in around the actuator arm.

Air flowing over the top of the wing is diverted downward by the combination of the open mechanical flap and the suction slot on the underside of the trailing edge of the wing. This system, which uses a simple mechanical flap in conjunction with a suction slot on the underside of the wing's trailing edge, has been tried experimentally in wind tunnels and has been found to produce higher lift coefficients than simple split mechanical flaps used alone, or suction slots used alone. The varying of the suction slot width with the opening of the mechanical flap and the curved internal actuator arm 320 inside the suction chamber are unique features of this suction-split flap.

The Suction Augmented Fixed-Wing Flight Control Surfaces

The purpose of this innovation is to further utilize the aircraft suction system to augment fixed-wing flight control surface effectiveness. The system has the following features:

(a) The control surfaces — elevator, rudders, and ailerons — would have porous sucked skin surfaces similar to the porous skin for other wetted areas of a suction surface skin aircraft.

(b) The suction through the control surface skin is variable, and when a control surface is turned, suction is automatically increased on the low pressure side of the control surface, which is the side that is turned away from the slipstream. This increases the effectiveness of slipstream deflection and minimizes the onset of drag inducing break-away turbulence. The purpose of this suction flight control surface system is to:

(1) Further reduce fixed-wing flight drag in straight and level flight by increasing the percentage of wetted skin area that has a suction surface.

(2) Increase flight control effectiveness at low transition speeds and complement the use of low speed-high lift suction split flaps and the low-speed lift of the upper surface blowing inboard elevator.

(3) The increased effectiveness of the flight controls enable smaller control surfaces to be used which will further reduce drag and reduce structural weight.

FIGS. 6 and 7 show a sectional view of the pivoting hollow shaft for the elevators 299 and the automatic suction control valves 315 and elevator control arms 301 and cables 302. This outer elevator pivot hollow shaft 299 passes through the thrust deflector pivot shaft 308, FIG. 10. As the outer elevators 60 are turned downward, FIG. 7, holes or slots in this inner shaft 299 match up with holes or slots in an outer shaft to create a rotary valve in the full open position 315b. This increases suction flow through the upper porous surface 94 of the outboard elevator 60. FIG. 6 shows the elevator control in neutral position for straight and level fixed-wing flight and the variable open suction air valve is in minimum open position 315a. FIGS. 8 and 9 show a section through the outer portion of the horizontal stabilizer 18 and elevator 60 illustrating how air is sucked through holes 300 in the elevator hollow pivot shaft 298, which then passes through the variable opening suction air valve 315, and then into the wing suction chamber.

The same basic variable suction augmented system used for the elevator can be applied to the ailerons, so no illustration is needed or shown for suction augmented ailerons.

The suction augmented system is also used for the twin rudder and is illustrated in FIGS. 11 and 12. The suction system for the rudder 5 differs from the elevator system in that the rudder has porous surfaces on both sides of the rudder with separate suction chamber for each side of the rudder, using the rudder suction chamber divider 316 to separate the chambers.

When the rudder and rudder hollow pivot shaft 303 are in neutral as in FIG. 11, equal quantities of air are sucked through the opposite porous sides of the rudder through the variable opening sucked air valve 317a. This is merely to maintain laminar flow over the rudder in straight flight. When the rudder is turned, FIG. 12, the rotary valve opens 317b to permit larger quantities of sucked air to be drawn in on the low pressure side of the rudder, and the valve closes to reduce or cut off sucked air from flowing through the high pressure side of the rudder. The higher suction on the low pressure side increases the capability of the rudder to alter the direction of the air flow at higher rudder turning angles and still maintain laminar flow, and therefore increase the effectiveness of the rudder.

The rudder control arms 305 and control cables 306, and turn-around cable control pulley 307 are shown in FIGS. 10, 11 and 12.

Suction Surface Skin System for Fixed-Wing Flight Laminar Flow Control

One of the principal barriers to the development of a practical sucked skin laminar flow control aircraft has been the absence of a practical suction skin for the aircraft. Problems encountered have been:

(a) Degradation of performance caused by clogging of the skin from insect accretion and dust.

(b) Excessive maintenance requirements of the skin, related to keeping the skin clean and unclogged.

(c) Maintaining differential suction flows over different areas of the aircraft to match differing suction requirements to maintain laminar flow.

(d) Problems related to lift destroying, reverse flow over low pressure upper surface of wings when the suction system is inoperable.

This suction surface skin system is designed to overcome the above-mentioned problems when used in conjunction with this tail-lifter VTOL. The suction surface skin system could also be applicable to other conventional fixed-wing aircraft, but would have greater skin clogging problems.

The system consists of a porous, compliant skin. Non-porous and non-suction compliant skins have been experimented with for drag reduction with some success; and so have more-or-less rigid porous suction skins been used experimentally. However, the combination of a porous and compliant skin has not been used, and there appears to be some advantage in using this combination.

The suction skin system of the present invention is illustrated in FIGS. 16 through 21, and consists of the following components:

FIG. 16 represents a sectional view of the outer skin 336, which is a relatively thin, fine pore, porous flexible suction skin. This outer skin is bonded to an inner, thick, coarse pore, porous flexible skin 337, which is shown in FIG. 17. The inner skin 337 is in turn bonded to the rigid, structural aircraft skin 339 shown in sectional view in FIG. 19. The wetted area structural skin 339 has threaded, countersunk round holes 340 in the aircraft skin. These holes are to admit suction air flow to the vacuum chambers in the wings and vacuum chambers beneath other wetted skin areas of the aircraft where sucked skin laminar flow is desired. Inserted in these holes are integral, one-piece, semi-flexible, non-return valve inserts 341, FIG. 18. These inserts may be made of materials, such as polyethylene, and be self-threading by the screw threading holes 340 in the aircraft skin 339. The counter-sunk inserts have a cross diameter bi-valve lip support bridge 341a on which two integral, flexible, bi-valve lip-hinges 341b support two non-return bi-valve lips 341c. The non-return valves are to prevent lift destroying reverse flow over the low or negative pressure upper surface of the wings when the suction system is not in operation. The prevention of reverse flow is essential for safety reasons in the case of malfunction of the suction system, and also because there are times during fixed-wing flight when it is not desirable to operate the surface suction system.

It should be noted that the holes in the aircraft skin 340 and the inserted valves are of varying sizes, shown in section in FIG. 19 and top view in FIG. 21, so that differential suction flows can be established over different areas of the aircraft in order to match differing suction requirements to maintain laminar flow. In order to maintain the flow differential established by the different size holes and valves, a grid of 'fences' or impervious or non-porous barriers 338 is incorporated in the skin 337. The grid 338 is shown in section in FIG. 17 and top view in FIG. 20. The non-porous grid or barrier 'fence' maintains the needed pressure differentials over different areas of the sucked skin by preventing air flow from migrating from a higher pressure area to a lower pressure area.

Cleaning or maintaining the porous suction skin in an unclogged condition can be done with conventional vacuum cleaners, and 'wet' detergent foam vacuum cleaners not unlike those used for cleaning carpets. The fact that the porous suction skin is flexible or compliant in depth, like a carpet, enables a cleaner to 'beat' or vibrate the flexible skin to help loosen the dust and insect accretion from the compliant skin, as does a carpet vacuum cleaner; and the thick, coarse pore inner flexible skin 337 allows the vacuum cleaner to create a reverse cleaning flow through the outer, thin, fine pore skin where the dust and insect accretion is lodged. The fine pore skin minimizes dust penetration to the coarse inner skin. That is, although the vaccum cleaner will automatically close the non-return valve inserts 341, reverse cleaning of the compliant skin is still possible by drawing in air from outside the vacuum cleaner nozzle, up through the thick, inner skin and out through the thin skin and into the vacuum cleaner bag. In other words, cleaning of the compliant skin is like cleaning a carpet, with the structural aircraft skin 339 that incorporates the non-return insert valves 341 being equivalent to the floor supporting the carpet.

The fact that suction for the laminar flow control suction skin is turned on only at high altitude where the air is clean and not at ground level or low altitudes where there is dust and insects greatly reduces the problem of porous skin clogging and related maintenance problems.

Also, the tail-lifter VTOL has special advantages over any conventional fixed-wing aircraft with a suction surface skin system in relation to the problem of pore clogging of the skin. Even with skin suction turned off, on conventional fixed-wing aircraft, the air speed on take-off and landing impacts dust and insects on the leading edge of the wing and clogs up the porous skin. The tail-lifter, on the other hand, which moves through the dust and insect zone at zero forward speed does not have this problem.

A potential problem with this suction skin system is the weakening of the stressed skin of the wing by the thousands of small holes required for suction air flow. The fact that the holes are round reduces the stress concentration, but there would be substantial weakening of the wing nevertheless, and this weakening must be compensated for by thicker skin or stronger skin material, or by modifying the internal structure of the wing. However, the use of the newer fiber composite materials for structural skin may be a better answer. By using a composite, such as the epoxy-graphite fibers, and molding the holes in the skin instead of later drilling the holes, the fiber matrix can be worked around the hole forms or protrusion in the forms so that the fibers are not cut and therefore the holes should not substantially reduce the strength of the epoxy-graphite fiber skin.

I claim:

1. A suction surface laminar flow aircraft capable of fixed-wing flight constructed so that the interior wing root of the aircraft acts as a suction chamber for the suction porous skin wing, and whereby a low by-pass ratio engine is immersed in the wing root suction chamber and the by-pass portion of the jet engine becomes the suction pump for the suction laminar flow control system by separating the intake air for the by-pass portion of the jet engine from the jet engine intake air by use of appropriate separate intake ducts with ram air from the leading edge of the wing root being ducted directly to the intake for the jet engine air, and a separate by-pass air intake duct connected with ambient outside air at an appropriate location, with a variable open-close valve at the entrance of said exterior or ambient air by-pass duct, said by-pass duct also incorporating another variable open-close valve along the by-pass intake duct which is immersed in the wing root vacuum chamber and is designed to admit air from the surrounding wing root vacuum chamber to the by-pass air intake, said interior vacuum chamber by-pass valve being used in conjunction with said exterior ambient by-pass air intake valve to regulate suction flow for the laminar flow suction skin system.

2. The structure of claim 1, wherein said by-pass air intake duct is also connected with a duct leading to the rotor stowage tube, said stowage tube duct incorporating an open-close valve to admit and draw in by-pass intake air through the stowage tube, said open-close stowage tube by-pass air intake valve being used in conjunction with said two other by-pass air intake valves whereby on rotor flight the interior by-pass air valve in the wing root vacuum chamber is closed and the exterior ambient air by-pass air valve is closed, or partially closed, so that intake air is drawn through the rotor tube so as to cool hot parts of the rotor inside the stowage tube and to reduce by-pass air intake noise.

3. An aircraft with a fixed wing having a split flap, said split flap used in conjunction with a suction slot beneath the trailing edge of the split flap, a suction chamber within the wing beneath said suction slot, said suction used to increase the effectiveness or lift of said split flap, said suction slot designed so that its width automatically varies with the opening of the split flaps and closes as the mechanical split flap closes, said suction slot opening progressively wider as the split mechanical flap opens with said variable width suction slot used to more efficiently utilize suction air and for better regulation of lift from the suction-split mechanical flaps.

4. The structure of claim 3, whereby the split mechanical flap utilizes an internal actuator crank arm within the suction chamber of the wing, said actuator arm curved as a segment of a circle with the flap hinge axis as the radius for both the inside and outside curves of the actuator crank arm, so that the curved actuator crank arm may slide in and out of the wing vacuum chamber on operation of the split mechanical flap while providing a tight seal between the actuator crank arm and the hole through which the curved crank arm passes.

5. An aircraft with flight control surfaces having a porous skin for surface suction on one or both sides of the control surface, a suction chamber within the control surface unit, the pivot for the control surfaces being a hollow tube through which sucked air is drawn, a part of said hollow pivot tube incorporating a valve which automatically varies the area through which sucked air is drawn and in turn varies the sucked air flow through the porous skin of the control surfaces, whereby when the control surface is moved from neutral, the hollow pivot incorporating the automatic valve automatically opens to allow increased suction air flow through the porous control surface on the low pressure side away from the slipstream so as to allow the increased suction flow to compensate for low pressure on the control surface in order to maintain laminar flow at higher angles of control surface movements for more effective slipstream deflection by said control surface.

6. An aircraft having a porous skin on wetted areas thereof used in conjunction with a suction system to suck air in through the pores of said skin for suction skin laminar flow control, said porous skin being substantially compliant and including a relatively thin fine pore outer skin and an inner substantially thicker coarser pore compliant skin bonded to the outer skin, said thicker skin also being bonded to the structural skin of the aircraft, means forming vacuum chambers beneath said structural skin, said structural skin having multiple spaced openings for sucking air through the pores of the compliant outer and inner skins into said vacuum chambers, said openings varying in size to adjust suction air flow which varies over specific skin areas on the aircraft, one-way valves of unitary construction and formed of flexible material disposed in said openings of the aircraft structural skin adjacent to low pressure areas of aircraft lifting surfaces, low pressures above said lifting surfaces automatically closing said one-way valves when the suction is inoperative and prevents reverse flow through said openings, thereby maintaining low pressure and maintaining lift above said lifting surfaces, said one-way valves having integral valve flap hinges and said valves inserted into said openings in the aircraft structural skin prior to the placement of said compliant outer and inner skins thereon, said one-way valves being fixedly anchored in said openings with the tops of the valves substantially flush with the aircraft structural skin.

* * * * *